(12) United States Patent
He

(10) Patent No.: US 11,982,338 B1
(45) Date of Patent: May 14, 2024

(54) MECHANICAL STRUCTURE FOR TELESCOPIC ROTATING BY A HELICAL ELASTIC PART

(71) Applicant: Jia He, Sichuan (CN)

(72) Inventor: Jia He, Sichuan (CN)

(*) Notice: Subject to any disclaimer, the term of this patent is extended or adjusted under 35 U.S.C. 154(b) by 0 days.

(21) Appl. No.: 18/495,892

(22) Filed: Oct. 27, 2023

(51) Int. Cl.
*F16H 19/00* (2006.01)

(52) U.S. Cl.
CPC .................. *F16H 19/003* (2013.01)

(58) Field of Classification Search
CPC ... F16B 7/10; F16B 7/105; B25J 18/00; B25J 18/04; F16C 31/02; F16H 19/02
See application file for complete search history.

(56) References Cited

U.S. PATENT DOCUMENTS

| | | | | |
|---|---|---|---|---|
| 3,854,712 A * | 12/1974 | McGee | ................... | B25B 5/003 269/275 |
| 3,914,871 A * | 10/1975 | Wolff | ................... | B23B 47/288 33/562 |
| 4,131,167 A * | 12/1978 | Richey | ................ | E21B 17/1078 175/323 |
| 4,602,898 A * | 7/1986 | Brown | ................... | B23B 47/288 408/72 R |
| 4,834,593 A * | 5/1989 | Fallon | ................... | B23B 47/288 408/72 R |
| 5,492,430 A * | 2/1996 | Jones | ...................... | F16B 7/149 403/109.5 |
| 5,924,658 A * | 7/1999 | Shiery | ................... | F16B 7/1409 248/161 |
| 6,595,226 B2 * | 7/2003 | Uemura | ................... | A45B 9/00 403/348 |
| 7,175,184 B1 * | 2/2007 | Rinner | .................. | B23B 31/202 279/43 |
| 7,392,589 B2 * | 7/2008 | Friegang | ............. | E04F 21/0069 33/41.6 |
| 7,740,249 B1 * | 6/2010 | Gao | ..................... | B23B 31/1071 279/22 |
| 8,147,358 B2 * | 4/2012 | Chen | ....................... | F16B 7/105 473/492 |
| 8,221,250 B2 * | 7/2012 | Roser | ................... | F16F 15/1201 464/169 |
| 11,137,006 B2 * | 10/2021 | Kennedy | ................. | F16B 7/105 |
| 2004/0247379 A1 * | 12/2004 | Guidetti | .................. | F16B 2/246 403/109.7 |
| 2007/0280797 A1 * | 12/2007 | McDaniel | ............. | B23B 47/287 408/115 R |
| 2019/0186519 A1 * | 6/2019 | Kennedy | .............. | A63C 11/221 |
| 2020/0282470 A1 * | 9/2020 | Duginske | .................. | B27C 5/04 |

* cited by examiner

*Primary Examiner* — Daniel J Wiley

(57) ABSTRACT

A mechanical structure for telescopic rotating by a helical elastic part is disclosed, including a main body. The main body includes an internal cavity and a locking part for fixing one end of the internal cavity, the locking part is externally configured with a bottom cover, and a rotating sleeve is configured at an entrance of the other end of the internal cavity. The mechanical structure can solve problems due to rotary telescopic structures in existing technologies adopt more parts and complicated structures.

10 Claims, 6 Drawing Sheets

MECHANICAL STRUCTURE FOR TELESCOPIC ROTATING BY A HELICAL ELASTIC PART

TECHNICAL FIELD

The present application relates to the field of mechanical structures, and particularly relates to a mechanical structure for telescopic rotating by a helical elastic part.

BACKGROUND

In mechanical structures, if socket rotation is to be realized, currently a way mainly uses the mechanical structures such as motor driven rotation, and gear meshing and rotation, or uses a spiral track to achieve limit rotation, which are widely used in, for example, mechanical processing, massage equipment, and mechanical transmission. However, the above structures for the socket rotation are more complex to realize, requiring configuration of motors or complex rotating structures, and do not have the rotation at the same time for telescoping.

In view of this, the present disclosure proposes a new mechanical structure that adopts a helical elastic part to achieve telescopic rotation, it does not need to configuration of complex rotary telescopic structures, nor does it use any electric drive form. Instead, it uses a simple helical elastic part to drive the rotation of an external object while telescoping, which can achieve the rotation and telescoping at the same time, thus meeting requirements of variety uses and processing, such as mechanical processing, massage equipment, adult sex toys, and mechanical transmission. Its structure is simple, easy to assemble and disassemble maintenance and replacement to use.

SUMMARY

Technical problem of the present disclosure aims to solve, at least to some extent, one of technical problems in related technologies. To this end, a main purpose of the present disclosure is to provide a mechanical structure for telescopic rotating by a helical elastic part, to address problems due to rotary telescopic structures in existing technologies adopt more parts and complicated structures.

Specifically, in some embodiments of the present disclosure, a mechanical structure for telescopic rotating by a helical elastic part is provided, including a main body. The main body includes an internal cavity and a locking part for fixing one end of the internal cavity, the locking part is externally configured with a bottom cover, and a rotating sleeve is configured at an entrance of the other end of the internal cavity. The internal cavity is composed of a flexible cavity and an embedded elastic part embedded in the flexible cavity, and the embedded elastic part is an elastic part having a helical structure. The internal cavity is externally sleeved with a housing, one end of the housing is movably connected to the rotating sleeve and the other end is fixedly connected to the locking part and the bottom cover.

In some preferred embodiments of the present disclosure, the flexible cavity has a soft rubber cavity structure by integrated injection molding, and the embedded elastic part is the elastic part placed in the flexible cavity during an injection molding process.

In some preferred embodiments of the present disclosure, the embedded elastic part is composed of at most two single helical elastic parts staggered splicing.

In some preferred embodiments of the present disclosure, one end of the entrance is configured with a rotary locking ring on its outer ring, and the rotary locking ring is rotationally snap-connected to a sealing cap on one side for sealing the entrance.

In some preferred embodiments of the present disclosure, the rotating sleeve is externally configured with balls for reducing friction with an inner wall of the housing at one end of the housing to facilitate rotation, and the inner wall of the housing is configured with grooves for easy sliding of the balls.

In some preferred embodiments of the present disclosure, the bottom cover is further sleeved with an external sleeve at tail for easy holding.

In some preferred embodiments of the present disclosure, the embedded elastic part is a plastic elastic part.

In some preferred embodiments of the present disclosure, the elastic part is a helical part formed by two lines winding.

In some preferred embodiments of the present disclosure, the bottom cover and the external sleeve have the same rotary-open structure as the sealing cap.

In some preferred embodiments of the present disclosure, the locking part has a ring structure, the locking part is sleeved with the one end of the internal cavity and fitted with the bottom cover to fixedly clamp the one end of the internal cavity.

The present disclosure has at least following advantages. The mechanical structure for telescopic rotating by a helical elastic part of the present disclosure, by embedding the helical elastic part, which is a simple helical elastic part, in the internal cavity composed of soft rubber, and rotating the external object while telescoping, rotation and telescoping can be realized at the same time without electric assistance and complicated mechanical structure. The overall structure is simple and clear, thereby can meet requirements of variety uses and processing, such as mechanical processing, massage, or transmission.

BRIEF DESCRIPTION OF THE DRAWINGS

In order to more clearly illustrate the technical solutions and objectives of the present disclosure, the following will be briefly described in conjunction with the embodiments and the accompanying drawings. It will be obvious that the accompanying drawings in the following description are only one part of embodiments of the technical solutions of the present disclosure, and for those of ordinary skill in the art, other accompanying drawings can be obtained based on the structures illustrated in these accompanying drawing, without paying any create labor.

Reference signs of the main parts/element are shown in the table below.

| Reference sign | Name | Reference sign | Name |
|---|---|---|---|
| 1 | main body | 13 | rotary locking ring |
| 10 | internal cavity | 14 | rotating sleeve |
| 100 | flexible cavity | 140 | balls |
| 1001 | entrance | 141 | fastener |
| 101 | embedded elastic part | 2 | bottom cover |
| 11 | housing | 3 | external sleeve |
| 12 | locking part | 4 | sealing cap |

DETAILED DESCRIPTION OF THE EMBODIMENTS

Figure 1:
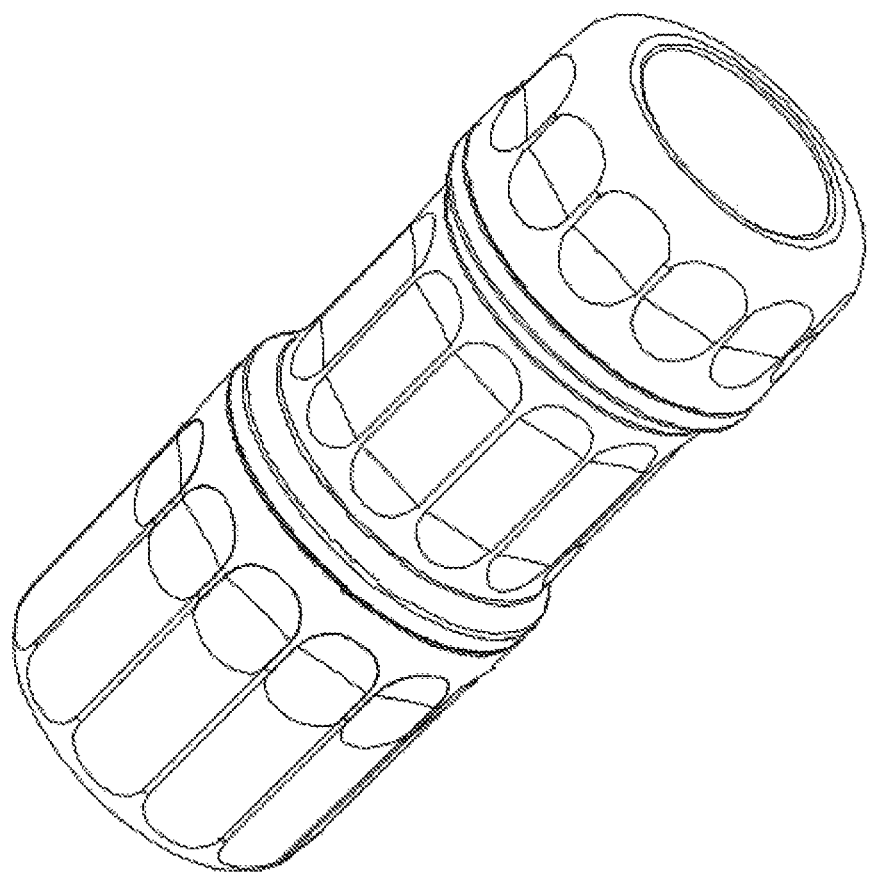
FIG. 1 shows a schematic diagram of an overall structure of a mechanical structure for telescopic rotating by a helical elastic part in accordance with some embodiments of the present disclosure.
Figure 2:
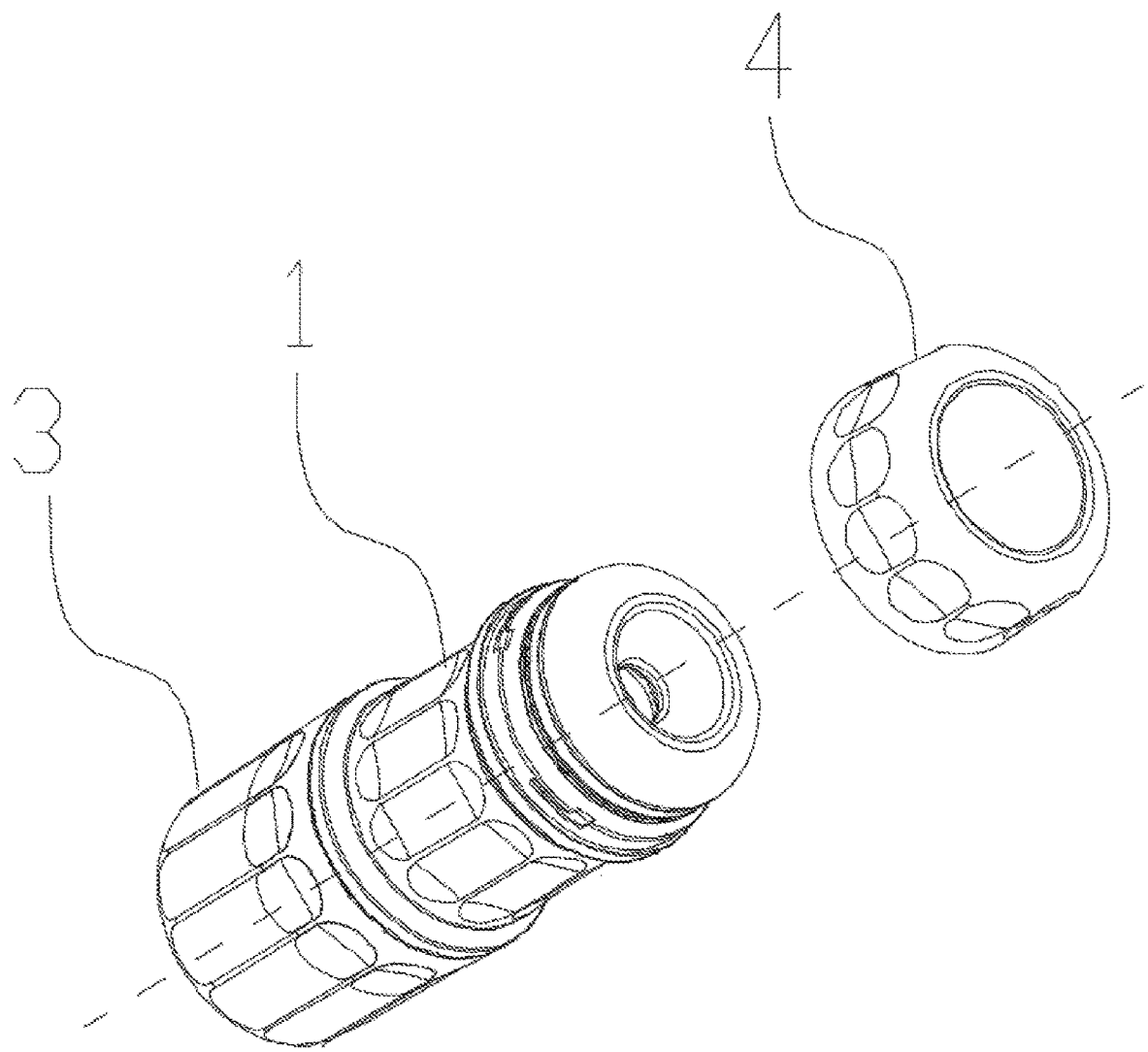
FIG. 2 shows a schematic diagram of an initial disassembly of a main body, a sealing cap and an external sleeve in accordance with some embodiments of the present disclosure.
Figure 3:
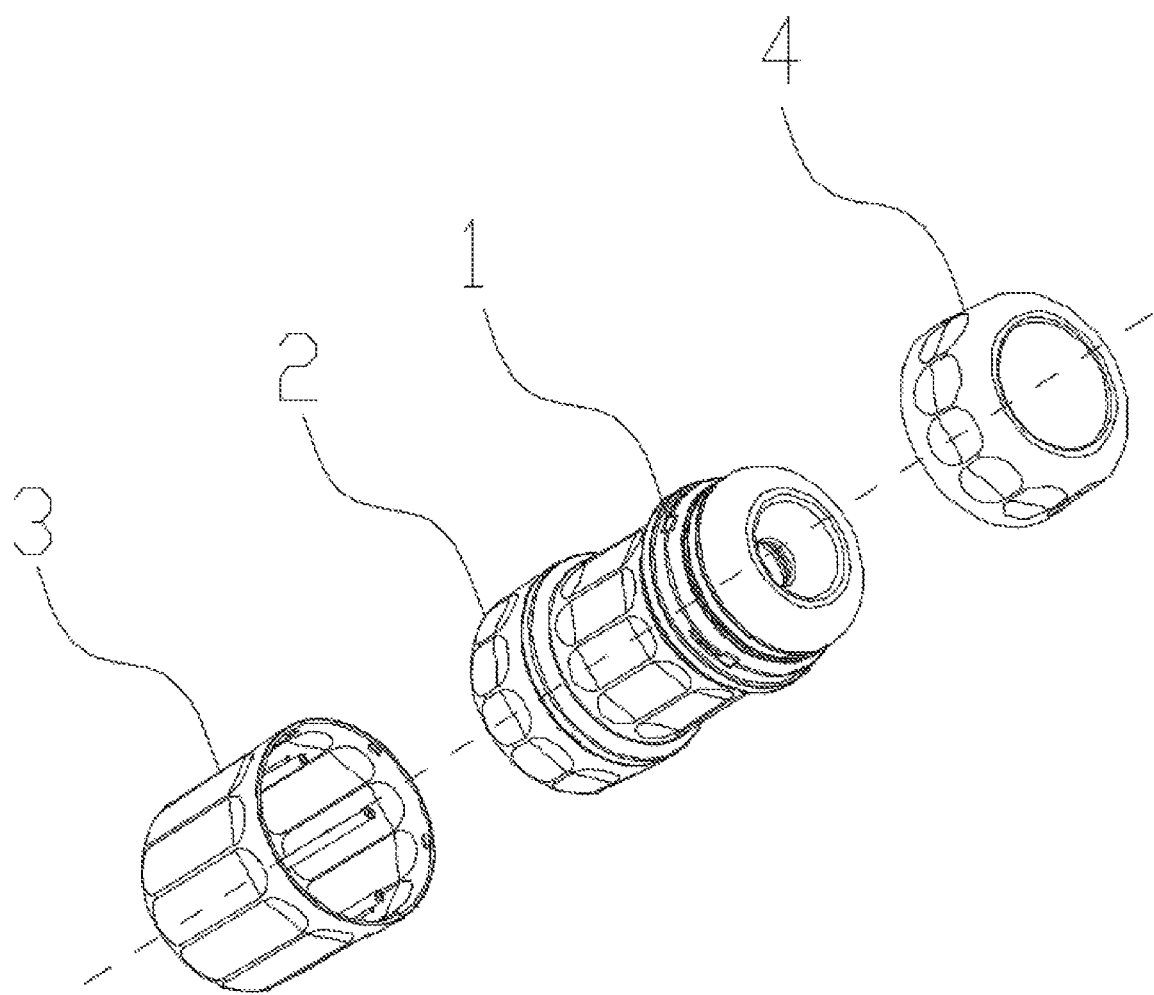
FIG. 3 shows a schematic diagram of the main body, a bottom cover, the external sleeve and the sealing cap after initial disassembly in accordance with some embodiments of the present disclosure.
Figure 4:
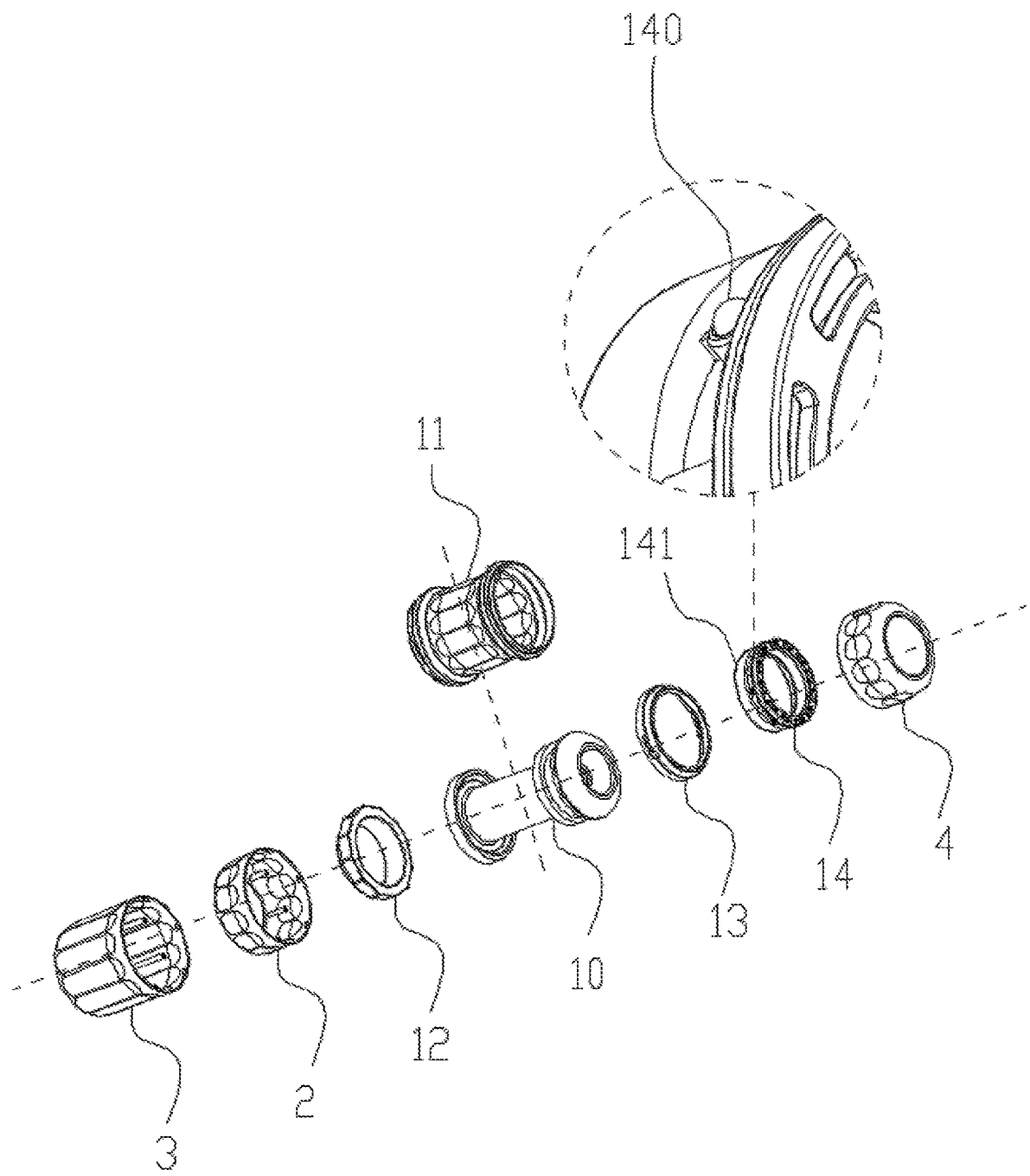
FIG. 4 shows a schematic diagram of an overall disassembled structure of the mechanical structure for telescopic rotating by a helical elastic part in accordance with some embodiments of the present disclosure.
Figure 5:
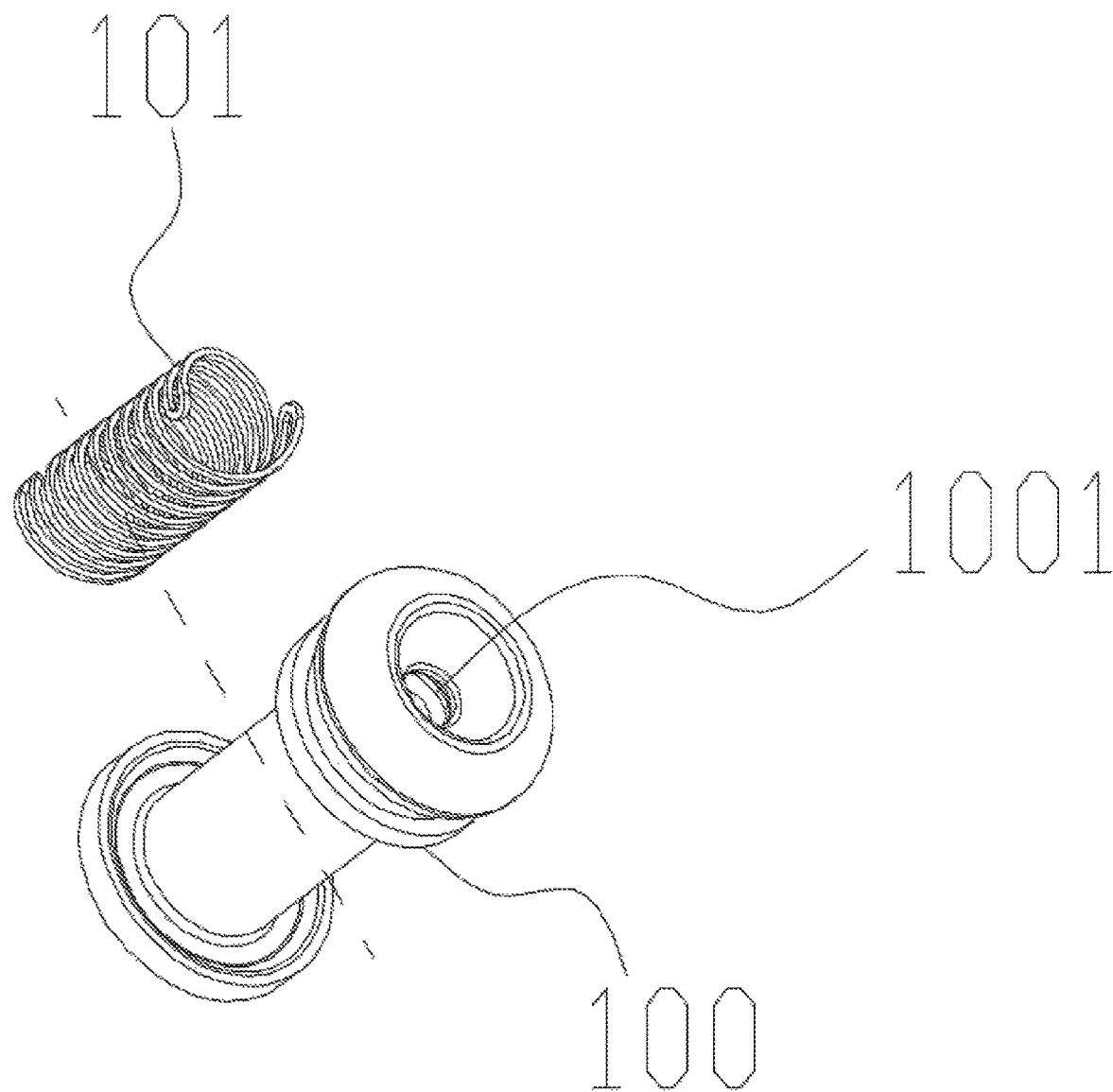
FIG. 5 shows a schematic diagram of a flexible cavity and an embedded elastic part in accordance with some embodiments of the present disclosure.
Figure 6:
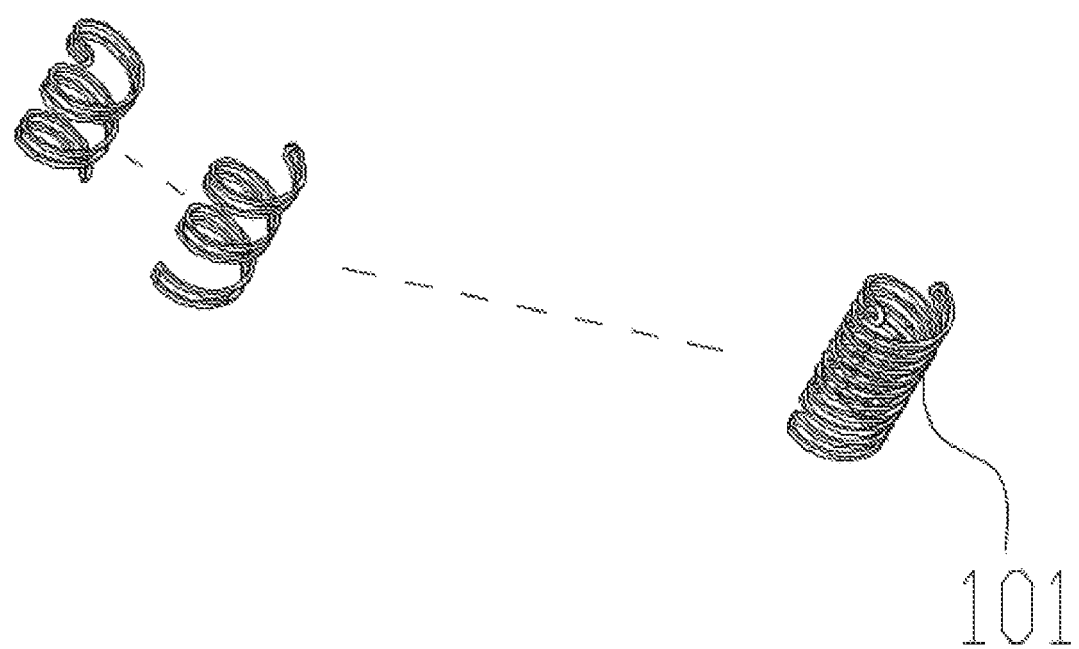
FIG. 6 shows a schematic diagram of composition of an elastic part in accordance with some embodiments of the present disclosure.

As shown in FIG. 1 to FIG. 6, in some embodiments of the present disclosure, a mechanical structure for telescopic rotating by a helical elastic part is provided, including a main body 1. The main body 1 includes an internal cavity 10 and a locking part 12 for fixing one end of the internal cavity 10, the locking part 12 is externally configured with a bottom cover 2, and a rotating sleeve 14 is configured at an entrance 1001 of the other end of the internal cavity 20. The internal cavity 10 is composed of a flexible cavity 100 and an embedded elastic part 101 embedded in the flexible cavity 100, and the embedded elastic part 101 is an elastic part having a helical structure. The internal cavity 10 is externally sleeved with a housing 11, one end of the housing 11 is movably connected to the rotating sleeve 14 and the other end is fixedly connected to the locking part 12 and the bottom cover 2.

Working principle is as follows. At work, when an external object enters from the entrance 1001 and then pulls to outside, at this time, because one end of the internal cavity 10 is fixed by the locking part 12, and the other end is movable and rotatable, and also because of the spiral embedded elastic part 101 of the flexible cavity 100, the object is subjected to rotational effect in a reciprocating motion of the flexible cavity 100, and a rotational force mainly comes from the embedded elastic part 101 thereof. The embedded elastic part 101 consists of single or multiple spiral elastic parts, and needs to be fixed with the flexible cavity 100 at one end, while the other end is movable and rotatable structure so as to rotate. In the embodiments, the rotating sleeve 14 is configured with balls 140, then the rotary locking ring 13 is pressed, and finally the fastener 141 is pressed, thereby the whole structure is pressed into the housing 11. The other end of the flexible cavity 100 is fixed by cooperation of the locking part 12 (the locking part 12 has a ring structure, the locking part 12 is sleeved with one end of the internal cavity 10, and is fitted with the bottom cover 2 to clamp one end of the internal cavity 10) and the bottom cover 2. When using, the housing 11, one side of the bottom cover 2, or the external sleeve 3 can be held, the sealing cap 4 is opened, then it will be used.

In some preferred embodiments of the present disclosure, the flexible cavity 100 has a soft rubber cavity structure by integrated injection molding, and the embedded elastic part 101 is the elastic part placed in the flexible cavity during an injection molding process.

The flexible cavity 100 as an outer part of the embedded elastic part 101, it has strong toughness, and can be rotated and stretched. The embedded elastic part 101 is placed into the flexible cavity 100 during the injection molding process and molded with the flexible cavity 100 to integrated injection molding.

In some preferred embodiments of the present disclosure, the embedded elastic part 101 is composed of at most two single helical elastic parts staggered splicing.

Use of the two single helical elastic parts is to solve problems of preventing lack of elasticity of a single helical structure, because two less coiled helical elastic parts are spliced together to form the embedded elastic part 101, which can lead to increased restoring force and longer service life.

In some preferred embodiments of the present disclosure, one end of the entrance 1001 is configured with a rotary locking ring 13 on its outer ring, and the rotary locking ring 13 is rotationally snap-connected to a sealing cap 4 on one side for sealing the entrance 1001. The bottom cover 2 and the external sleeve 3 have the same rotary-open structure as the sealing cap 4.

In use, the sealing cap 4 is opened by rotating it to one side to disengage it from the rotary locking ring 13. After use, the sealing cap 4 is rotated to the other side to lock it against the rotary locking ring 13.

In some preferred embodiments of the present disclosure, the rotating sleeve 14 is externally configured with balls 140 for reducing friction with an inner wall of the housing 11 at one end of the housing 11 to facilitate rotation.

In some preferred embodiments of the present disclosure, the bottom cover 2 is further sleeved with an external sleeve 3 at tail for easy holding. The external sleeve 3 may be regarded as an extension housing for ease of holding or mechanical fixation.

In some preferred embodiments of the present disclosure, the embedded elastic part 101 is a plastic elastic part. The embedded elastic part 101 is the plastic elastic part with a certain resilience and ductility, and has a rectangular cross-section, preferably, the elastic part is a helical part formed by two lines winding.

The above is only some preferred embodiments of the present disclosure, and is not intended to limit the patent scope of the present disclosure. Any equivalent structural transformations made by utilizing the contents of the specification of the present disclosure and the accompanying drawings under the conception of the present invention or directly/indirectly applying them in other related technical fields are included in the protection scope of the present invention.

What is claimed is:

1. A mechanical structure for telescopic rotating by a helical elastic part, comprising a main body; wherein
the main body comprises an internal cavity and a locking part for fixing one end of the internal cavity, the locking part is externally configured with a bottom cover, and a rotating sleeve is configured at an entrance of the other end of the internal cavity, the internal cavity is composed of a flexible cavity and an embedded elastic part embedded in the flexible cavity, and the embedded elastic part is an elastic part having a helical structure; and
the internal cavity is externally sleeved with a housing, one end of the housing is movably connected to the rotating sleeve and the other end is fixedly connected to the locking part and the bottom cover.

2. The mechanical structure for telescopic rotating by a helical elastic part according to claim 1, wherein the flexible cavity has a soft rubber cavity structure by integrated injection molding, and the embedded elastic part is the elastic part placed in the flexible cavity during an injection molding process.

3. The mechanical structure for telescopic rotating by a helical elastic part according to claim 1, wherein the embedded elastic part is composed of at most two single helical elastic parts staggered splicing.

4. The mechanical structure for telescopic rotating by a helical elastic part according to claim 3, wherein the elastic part is a helical part formed by two lines winding.

5. The mechanical structure for telescopic rotating by a helical elastic part according to claim 1, wherein one end of the entrance is configured with a rotary locking ring on its outer ring, and the rotary locking ring is rotationally snap-connected to a sealing cap on one side for sealing the entrance.

6. The mechanical structure for telescopic rotating by a helical elastic part according to claim 5, wherein the bottom cover is further sleeved with an external sleeve at tail for easy holding.

7. The mechanical structure for telescopic rotating by a helical elastic part according to claim 6, wherein the bottom cover and the external sleeve have the same rotary-open structure as the sealing cap.

8. The mechanical structure for telescopic rotating by a helical elastic part according to claim 1, wherein the rotating sleeve is externally configured with balls for reducing friction with an inner wall of the housing at one end of the housing to facilitate rotation, and the inner wall of the housing is configured with grooves for easy sliding of the balls.

9. The mechanical structure for telescopic rotating by a helical elastic part according to claim 1, wherein the embedded elastic part is a plastic elastic part.

10. The mechanical structure for telescopic rotating by a helical elastic part according to claim 1, wherein the locking part has a ring structure, the locking part is sleeved with the one end of the internal cavity and fitted with the bottom cover to fixedly clamp the one end of the internal cavity.

* * * * *